Figure 1:
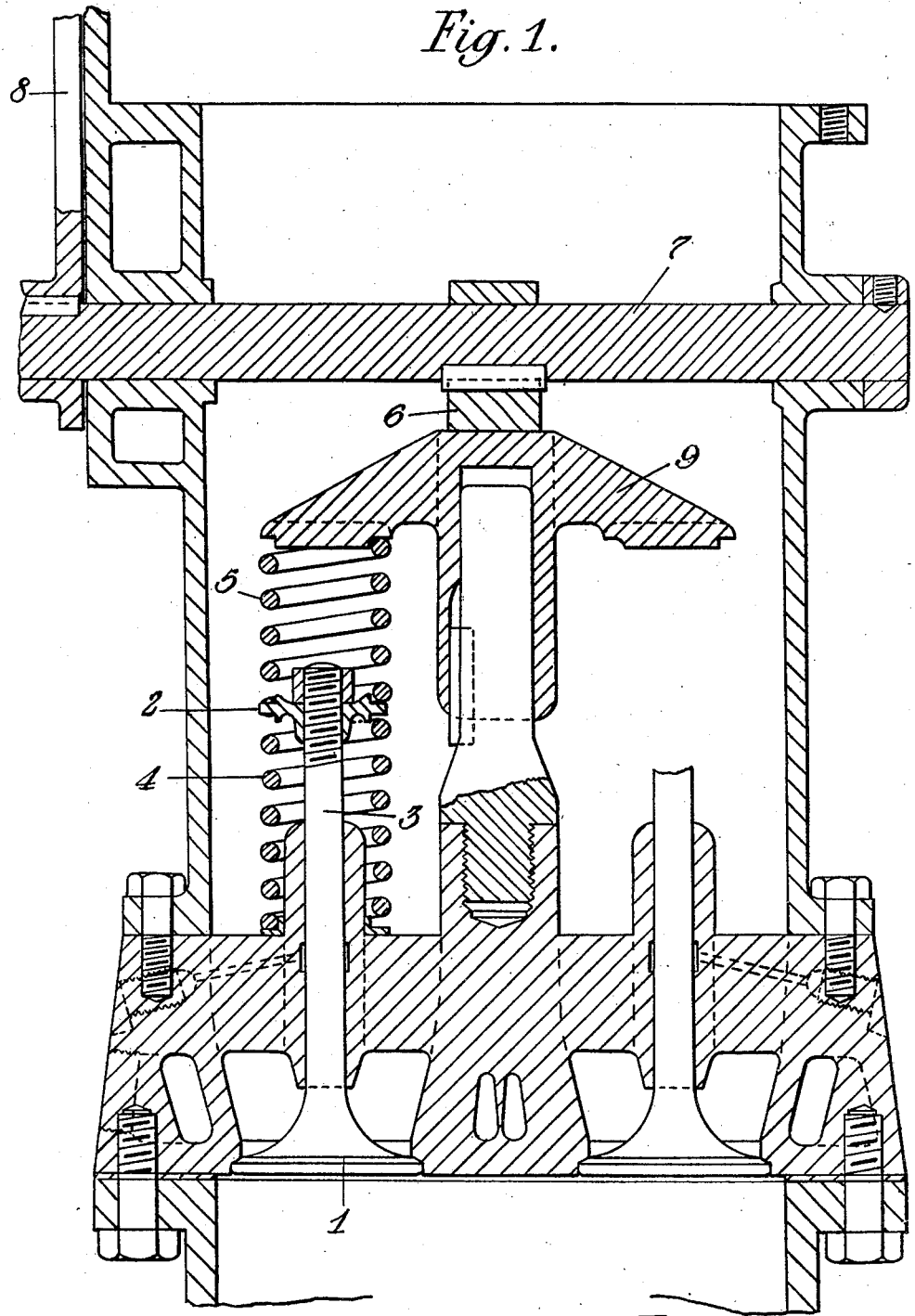

June 9, 1953　　　W. P. MANSFIELD　　　2,641,236
MEANS FOR ACTUATING VALVES AND OTHER RECIPROCATING PARTS
Filed Dec. 11, 1945　　　　　　　　　　　　　　5 Sheets-Sheet 2
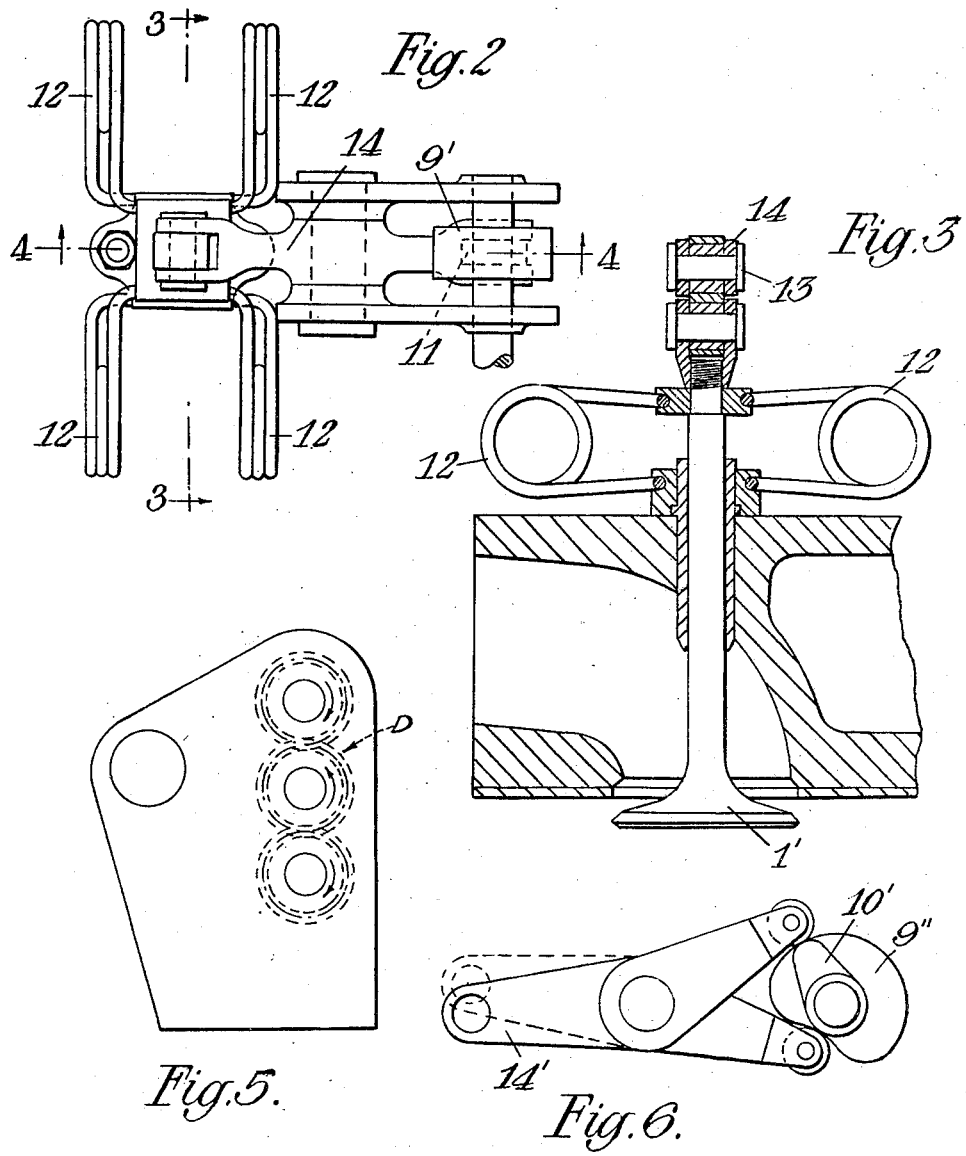
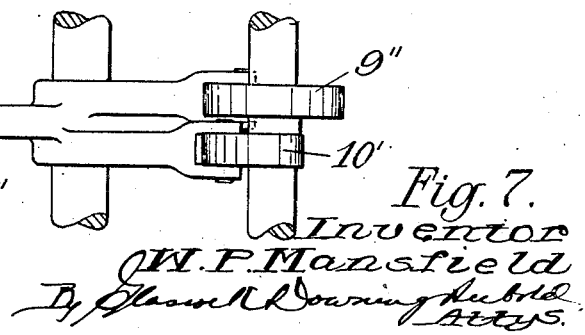

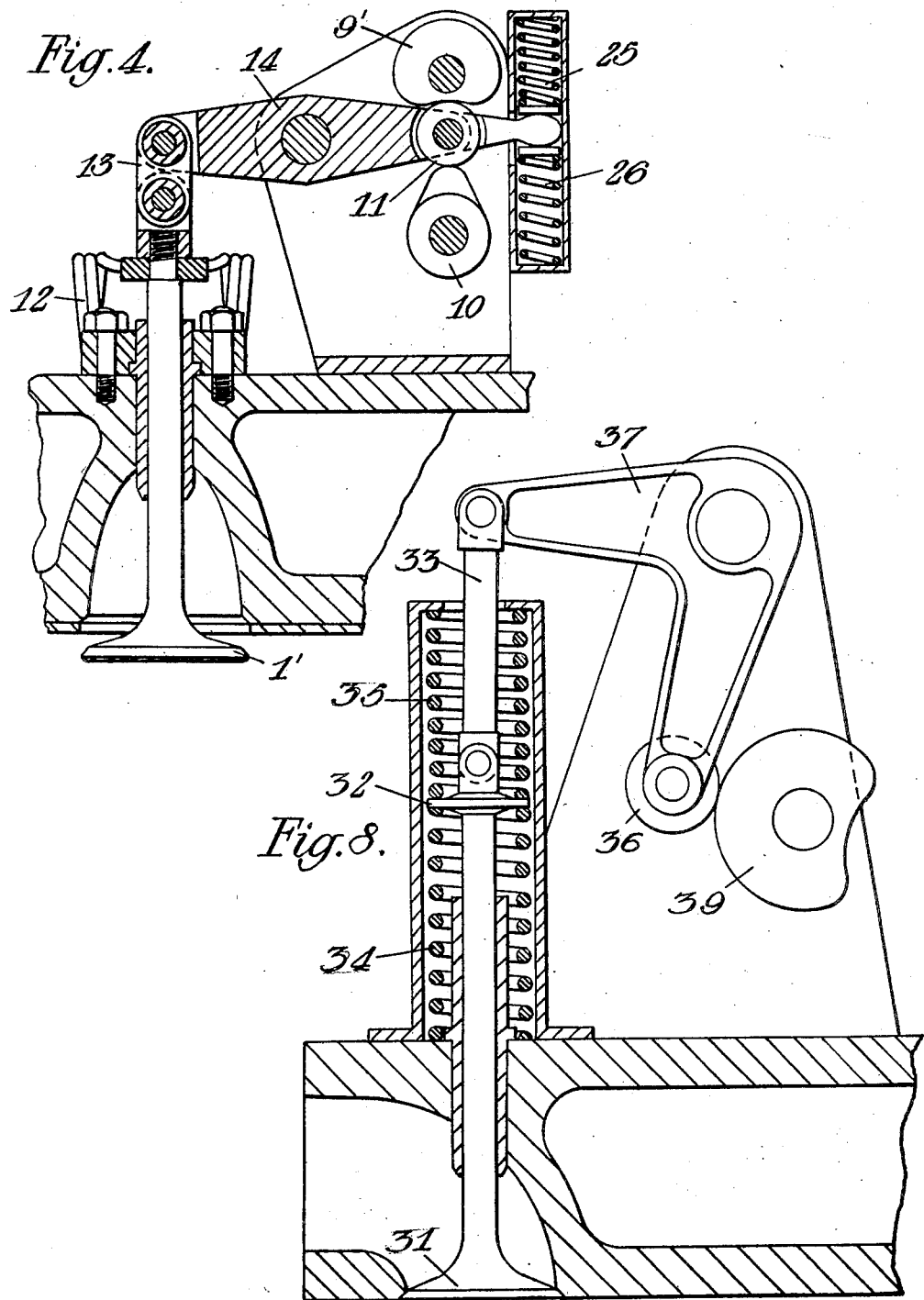

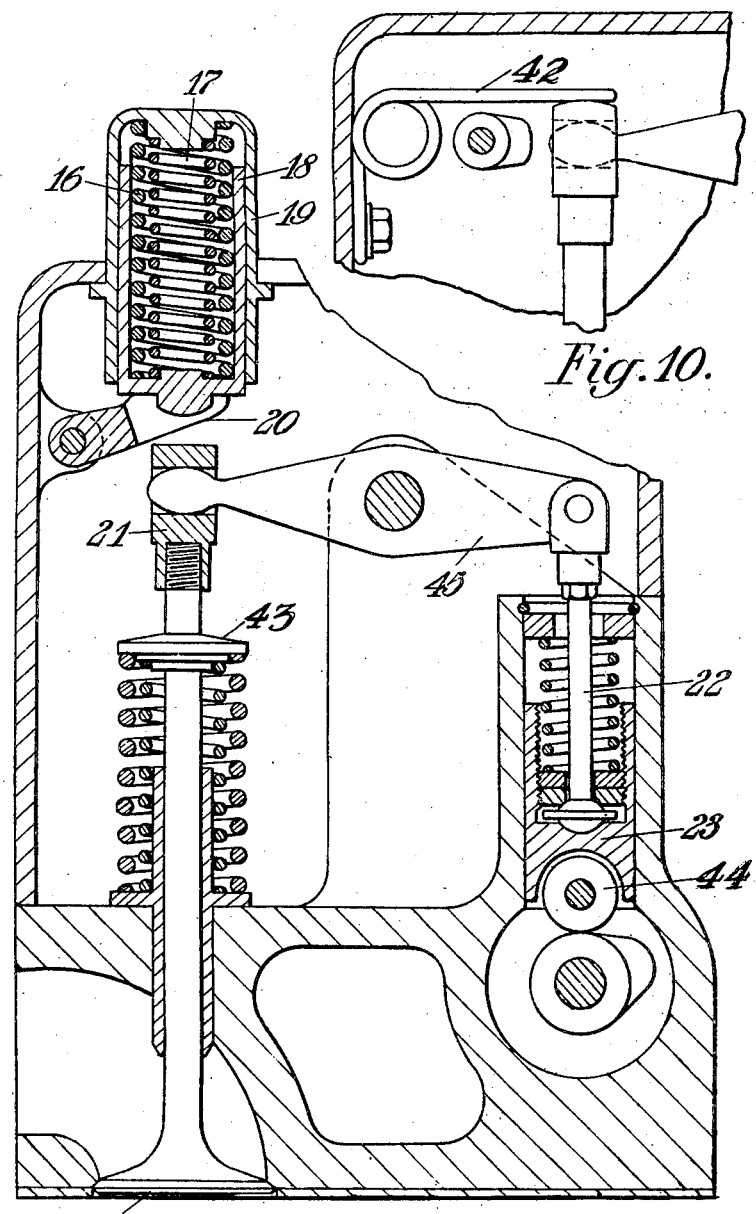

Inventor
W. P. Mansfield

Patented June 9, 1953

2,641,236

UNITED STATES PATENT OFFICE 2,641,236

MEANS FOR ACTUATING VALVES AND OTHER RECIPROCATING PARTS

Wilfred Percival Mansfield, Slough, England, assignor to Sir W. G. Armstrong Whitworth & Company (Engineers) Limited, London, England Application December 11, 1945, Serial No. 634,347
In Great Britain October 11, 1944

Section 1, Public Law 690, August 8, 1946
Patent expires October 11, 1964

13 Claims. (Cl. 123—90)

1

This invention relates to means for actuating valves and other reciprocating parts and has for its object to obviate defects of known systems which may be exemplified by reference specifically to the case of valves.

In the case of automatic gas operated non-return valves, energy must be taken from the gases to effect the required acceleration at each opening and closing of the valve, and when the valve has attained its maximum velocity, it is brought to rest by striking a stop. Hence the valve is required to be sufficiently strong, and therefore heavy, to withstand the resultant impact stresses, while on the other hand, it should be extremely light in order to achieve the necessary high acceleration with small pressure differences. These two requirements are mutually incompatible, at high operating speeds, while the energy loss is 100 per cent and the energy is largely employed in destroying the valve.

In the case of the valves of internal combustion engines, the valve operating gear is designed to withstand the sum of the stresses due to the spring load and to the accelerating forces. As speeds of operation increase, however, very strong springs are required to maintain contact throughout the valve gear on the return movement and these, in conjunction with the increased inertia forces, necessitate heavier parts. The result is that higher speeds are obtainable only by sacrificing valve area, although the area should properly be increased to maintain volumetric efficiency.

With the actuating means of the present invention a valve and its associated reciprocating parts will attain their maximum velocity at some point in their travel between the end points so that wear will be reduced to a minimum, very little energy being required from any outside source and thus a satisfactory conservation of energy will be achieved. The present invention also affords the possibility of obtaining a large area of opening at high engine speeds, so that higher speeds can be obtained with greater efficiency than by the existing methods of operation.

According to my invention the part to be reciprocated is carried by a resilient mounting such that when the part is moved to one end of its travel and released it will reciprocate with a damped harmonic motion, and a small restoring force is applied intermittently to the device in order to maintain the full amplitude of the motion. Conveniently, in accordance with the invention, the resilient mounting is constituted by a spring device attached to the reciprocating part, or by two oppositely acting spring devices between which is secured a collar or other suitable

2 member in turn mounted on the reciprocating part.

The restoring force in accordance with the invention may be applied, for example: (a) by mechanical means, such as a cam, driven from some other part of the machine, and designed to push or pull the reciprocating part to the full extent of its travel in one direction or alternately in both directions. The remaining portion of the cam profile may be shaped to follow the rest of the motion of the reciprocating part without applying force or alternatively may apply small forces to modify the forces imparted by the actuating means; (b) by gas pressure, either directly on the main reciprocating part itself or on a part connected thereto; to ensure that the reciprocating part moves to the full extent of its travel.

Figure 11:
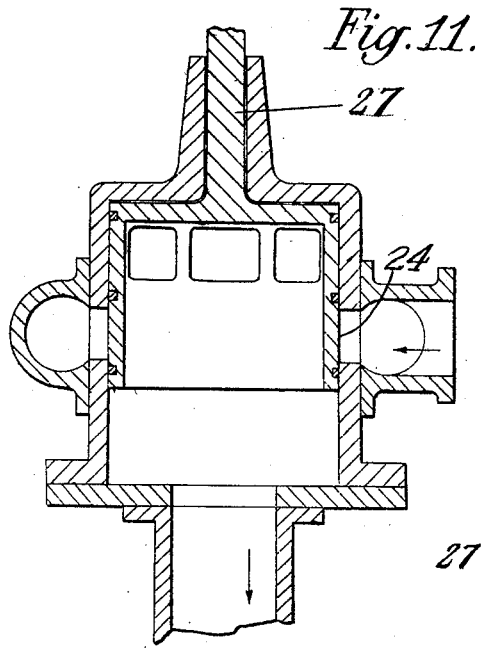
Figure 12:
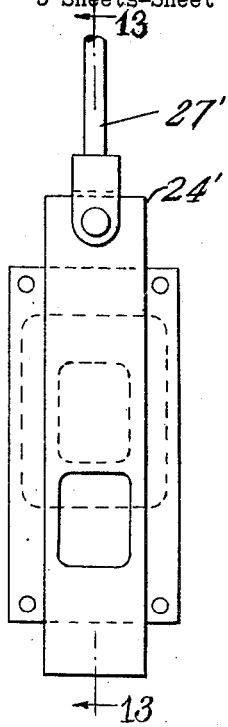
Figure 13:
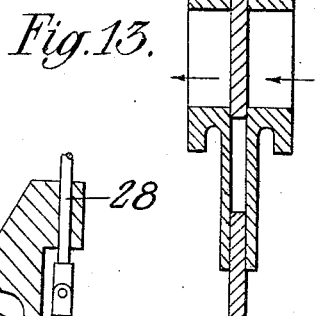
Figure 14:
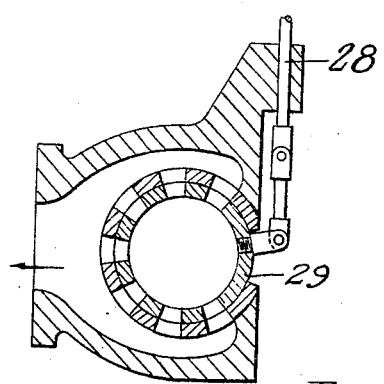
Figure 15:
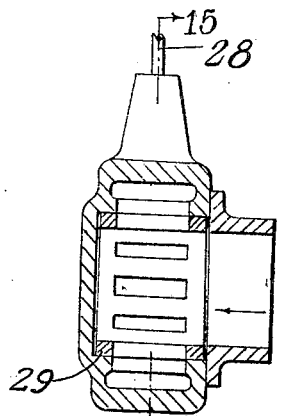

Further features and advantages of the invention will be apparent from the following description taken in connection with the accompanying drawings in which:

Figure 1 is a view partly in section and partly in elevation illustrating an embodiment of the invention including a simple poppet valve, Figure 2 is a partial plan view of an embodiment illustrating a positively actuated poppet valve, Figure 3 is a view partly in section and partly in elevation taken on line 3—3 of Figure 2, Figure 4 is a sectional elevation taken on line 4—4 of Figure 2, Figure 5 is a side elevation showing the gearing for driving the cams illustrated in Figure 4, Figure 6 is a side elevation illustrating a forked lever valve actuating mechanism, Figure 7 is a plan view of the lever mechanism shown in Figure 6, Figure 8 is a sectional elevation of a poppet valve actuated by a single cam, Figure 9 is a sectional elevation showing a conventional valve system modified in accordance with the teachings of the invention, Figure 10 is a fragmentary view illustrating the substitution of a hair pin type spring in the embodiment shown in Figure 9, Figure 11 is a sectional view illustrating a reciprocating piston valve, Figure 12 is an elevational view of a slide valve, Figure 13 is a sectional view taken on line 13—13 of Figure 12, Figure 14 is a sectional view of an oscillating rotary valve, while Figure 15 is a view partly in section and partly in elevation taken on line 15—15 of Figure 13.

In carrying my invention into effect in one convenient manner, as shown in Figure 1 for example, when operating a poppet valve 1 controlling the movement of gas, a collar 2 is mounted upon the valve stem 3 and two opposing compression springs 4, 5 are arranged to act upon opposite surfaces of the collar which, as shown, is located between them. It is preferable to employ two springs in this manner and so avoid the difficulty of attaching a spring to the valve, and of reversal of stress in the springs.

When a vertical valve, opening downwards as shown, is in its closed position the lower spring 4, at its center, is only a little shorter than its free length and the upper spring 5 is fully compressed. When the valve is fully open the upper spring 5 is only slightly compressed, and the lower spring 4 is fully compressed. In this case it is assumed that the speed of operation is fixed so that the pressure in the chamber, to which the valve controls the movement of gas, rises cyclically to a value sufficient to overcome the maximum pressure of the spring so that the restoring force may be applied by gas pressure.

As the valve approaches the end of its travel towards its closed position, the valve head may enter a recess or masking provided in the cylinder port, as shown, so that under the action of the rising pressure in the chamber, the valve head acts as a piston in the cylinder constituted by the masking, and the motion is maintained until it reaches its seat. The pressure in the chamber is by this time sufficient to hold the valve on its seat against the force of the upper spring 5. Later in the cycle, the pressure in the chamber falls so that as soon as the force exerted by gas pressure on the head of the valve is less than the force exerted by the upper spring 5, the valve begins to open.

The energy required to accelerate the valve is stored in the upper spring, and as the restraining force due to the gas pressure on the valve head is removed, this potential energy in the upper spring is converted into kinetic energy of the valve, spring plate or collar, and springs. This process continues until the two springs are exerting equal and opposite forces, that is, at about the mid-point of travel of the valve, and at this point the whole of the energy in the system is in the kinetic form and velocity is at a maximum. This process of energy conversion is then reversed, as the lower spring decelerates the system, and thus gains, by conversion of the kinetic energy, almost as much potential energy as was previously present in the upper spring, until the system comes to rest and reverses, eventually attaining its maximum velocity once more, but in the direction towards the closed position. Thereafter the upper spring is again compressed and substantially the initial position is attained. As the valve enters the masking, and the pressure in the chamber is rising, a small amount of energy is removed from the gas to replace that which has been lost from the system due to friction and so forth. Since the frictional and other losses are small, a very satisfactory conservation of energy is achieved by this method.

It will be seen, therefore, that while the movement of the valve system is a damped harmonic vibration its period of duration may form any required portion of the gas pressure cycle, since so long as the gas pressure rises above the minimum necessary to maintain the valve on its seat against the force exerted by the upper spring 5, the valve will close and will remain closed, while the said minimum pressure is exceeded. The motion of the valve system comprises one cycle or complete vibration, followed by a period of rest in the closed position, which may be of any desired duration. The next cycle commences as soon as the pressure in the chamber has fallen to a predetermined value. Thus the movement of the valve system commences under the same conditions and from the same point in each pressure cycle.

At the commencement of the series of pressure cycles it is necessary to synchronize the movement of the valve with the cycle, and one method of doing so is illustrated in Figure 1. Cam 6, which may have a slowly rising and sharply falling contour, is mounted on shaft 7 and may be automatically or manually operated by the lever 8. Rotation of cam 6 controls the position of the spring support 9, so that when the support 9 is allowed to move upwards the opening spring 5 becomes ineffective and the valve remains closed under the action of spring 2. The spring 5 may be rendered operative during the high pressure period, the valve being maintained closed by the gas pressure and when the pressure in the chamber has fallen to a predetermined value, the valve will open and operate as described.

An arrangement, such as is above described, may be very conveniently employed in combustion products generators such as are described in the specification of my co-pending application Serial No. 634,346, filed 11th December 1945.

In a further example of carrying the invention into effect, I may apply an arrangement as above described, without any operating gear, to a two-stroke cycle internal combustion engine having airports in the cylinder walls, and exhaust valve in the head, or vice versa and running at a constant speed, and the gas pressure during the early part of the compression stroke could supply the small amount of energy lost per cycle, as previously described. Such an engine would have to be motored to its full speed, the valve moved to its closed position, and then released in timed relationship with the engine cycle. It would not be necessary to time the release of the valve very accurately since if it occurs at any time during the high pressure period, which occupies more than half the cycle, the valve will remain on its seat until the pressure falls, and will then operate correctly. The valve may be placed in its closed position by suitable automatic or manually operated means, such as that described above. The above simple engine arrangement might be practicable in a generating set in which the generator could be used to motor the engine up to the constant working speed, or in an aircraft engine operating at constant speed with a variable pitch propeller.

The operating speed range could be extended by providing means for altering the natural frequency of the spring and the valve system. Any type of spring, for example, coil, hairpin, beam, leaf or combination thereof, may be used. A beam spring could be provided with a roller which by moving along it would clamp and render inoperative varying amounts of its length.

A further advantage of this system when coil springs are utilized resides in the fact that all points in the system, including the coils of the springs move with a simple harmonic motion and thus all points in the system are at rest on the completion of each cycle and spring surging does not occur. The small external force applied to the system, in the particular embodiment described, by the action of gas pressure on the valve as it nears its seat is unlikely to introduce high order harmonics into the valve lift curve tending to excite surging.

Another important advantage is that the absence of valve operating gear and the absence of spring surge result in much quieter operation that can be achieved with normal arrangements.

A more generally applicable method will be to provide mechanically operated valve gear, which will both open and close the valve, but which will be increasingly relieved of stress as the speed approaches the optimum operating speed. At this optimum speed, the operating gear would in some cases be completely unloaded, and may be rendered inoperative, as for example, in the two-stroke engine application described above. Alternatively the mechanical gear could serve to hold the valve in its fully open position for the required period without doing any work. If desired the mechanical gear could supply the restoring force necessary to make up for that lost in friction, but usually the rising gas pressure on the compression stroke will be available for this purpose as the valve nears its seat. This arrangement would be suitable for use on a 4-stroke cycle engine.

If mechanically operated gear is provided for closing the valve it should generally be adjusted to bring the valve to within a few thousandths of an inch of its seat, the gas pressure being used to effect the seal.

Another convenient method of applying the invention when operating at the lower speeds, is to move the spring supports to a new position, such that the spring draws the valve on to its seat. Or again when opposing springs are used, the opening spring may be rendered ineffective by moving the spring supports, as by a cam such as 6, previously described, so that the closing spring is operative all the time. In the latter case, a normal valve operating gear may be provided to open the valve, so that at low speeds the operation is by the usual method. As the speed at which the natural frequency of the system corresponds with the low pressure portion of the gaseous pressure cycle is approached, the spring supports could be moved to the full operation position, and the valve would be controlled almost completely by the springs. While the engine speed is slightly lower than the optimum the valve will tend to close too soon but the cam will hold it off its seat and when its kinetic energy has been absorbed by the operating gear it will tend to open again under the action of the spring. However, providing the valve head is within the masking, and the cylinder pressure rise at this time is sufficient, the valve will be pressed on to its seat by the compression pressure. At speeds above the optimum the valve will receive some of its accelerating force from the driving gear. Its lift will be increased and it will not follow the cam on its return movement while its total period, in terms of degrees of crankshaft movement, will be increased. A suitable compromise is necessary to obtain the best conditions over the desired speed range.

In a system of the type shown in Figure 1, which was tested, the total mass of the moving parts, excluding the springs, was 0.787 lb. Each spring weighed 0.056 lb. and has a rate of 76.2 lbs./in. This system has a natural frequency of 2650 vibs./min. and was designed for use in an engine running 1,000 R. P. M. with a valve opening period of 136 degrees of crank angle.

Various combinations of the above methods are possible, for example, variable spring support position, combined with various spring rate. If desired, the valve operating gear may be rendered inoperative at or near the optimum speed. A tachometrical device, for example, the engine governor, may be used to render the valve spring system fully operative and the operating gear inoperative and vice versa.

As previously described the masking of the poppet valve is provided for the purpose of ensuring the closure of the valve and the application of the restoring force, but, the same time it is necessary to ensure that when the valve clears the masking and effective opening commences the pressure in the chamber has fallen to the desired value. On the other hand, deep masking reduces the total area of opening, and consequently a suitable compromise between these two features is necessary.

Figures 2, 3, 4, and 5 illustrate an embodiment in which the valve 1' is positively actuated by means of cams 9' and 10 so that its operation over a wide range of speed is assured, the object of the invention in this case being to unload the driving gear at high speeds.

By way of example, the valve 1' may be the exhaust valve of a two-stroke internal combustion engine. Suppose that the normal working speed of the engine is N R. P. M. and that it is desired to obtain minimum force in the driving mechanism at this speed. If the desired lift curve approximates to a complete cycle of harmonic motion occupying $d$ degrees of crank-angle then the oscillating system comprising valve, link, rocker-arm and roller together with the springs will be tuned by the choice of the springs 26 and 25 of suitable stiffness in relation to the inertia of the oscillating parts, or by adjustment of the mass of the system, though this will normally be pept to a minimum, to a natural frequency of $$N \times \frac{360}{d}$$

vibrations per minute, and the position of the valve will be adjusted so that with the system at rest and in equilibrium the valve will be at the mid point of its travel.

These provisions ensure that if the valve is released from its seat it will open fully and close again in a period corresponding to the required crank-angle $d$ at N R. P. M., without the application of external force so that when running at N R. P. M. the function of the upper cam 9' shown in Figure 4 will be to hold the valve 1' in the closed position during the desired closed period and merely follow the roller 11 during the opening period while the lower cam 10 applies no force whatever at this engine speed.

If the required lift diagram consists of one half of a cycle denoted SHM of simple harmonic motion, valve opening, followed by a period of dwell in which the valve remains stationary in the open position, after which the second half of the SHM cycle follows to close the valve, the oscillating system is tuned to a natural frequency of $$N \times \frac{360}{d}$$

$d$ being the crank-angle corresponding to the complete period of SHM, that is the two half periods only, and not in this case the complete valve period. If the desired lift curve deviates from SHM the period $d$ of the SHM which most closely corresponds to it is determined and the oscillating system tuned to $$N \times \frac{360}{d}$$

When running at N R. P. M., the cams which are desired to give the required lift curve, apply small correcting forces to modify the SHM motion which the oscillating system tends to perform. Such forces will be very much smaller than in the normal arrangement where the cam must overcome the full inertia forces together with the spring force.

In Figures 2, 3 and 4 hair-pin type springs 12 are shown and the valve operating gear consists of a link 13, rocker arm 14 with roller 11, and two cams 9' and 10. The link 13 is provided with rubber bushes to allow the gear to be adjusted to bring the valve on to its seat, and the masking shown in Figure 1 becomes unnecessary. The lower cam 10 moves the valve 1' away from its seat and the upper cam 9' moves the valve towards its seat, the two being so designed that the roller 11 has at all times a small constant clearance between them. One possible method of operating the two cam shafts is by means of the small gear train indicated at D, Figure 5, the intermediate wheel being used to give the two cams directions of rotation which will suit that of the roller.

As an alternative, the valve lever and cam shafts shown in Figures 2 to 5 may be replaced by a forked valve lever 14' and a single cam shaft carrying both the opening cam 10' and the closing cam 9'' as shown in Figures 6 and 7.

In some applications one cam alone will control the motion satisfactorily when the engine is running at speeds other than that for which the system is tuned. A suitable system of this type is shown in Figure 8. Here again, the oscillating system comprising valve 31, spring plate 32, connecting link 33, lever 37 and roller 36 together with the springs 34 and 35 will be designed with a natural frequency of vibration of $$N \times \frac{360}{d} \text{ vibs. per min.}$$

where N is the speed at which it is desired to unload the cam shaft of inertia forces completely. The action is as follows: At low speeds the cam 39 allows the valve 31 to open slowly to the mid point of its stroke, that is, its equilibrium position, but since it has by then attained only a small velocity it does not open much further. As the cam 39, which is designed to follow the full travel of the valve at its full working speed, continues to rotate, the roller 36 leaves it. Later, contact is made again and the cam 39 draws the valve to its closed position at the correct timing. Thus at low speeds the lift of the valve is little more than one half of its full lift. In many applications this is not a serious disadvantage and may be an advantage.

As the speed of rotation of the cam shaft is increased the increasing velocity with which the valve 31 and lever 37 pass their mid-position and the roller 36 follows the cam 39 more closely. When the designed operating speed is reached the cam 39 serves merely to hold the valve on its seat during the closed period.

With this arrangement impact occurring between the roller and cam at speeds between the idling speed and the full working speed of the engine may result in noisy operation at such intermediate speeds but if the application is one in which the engine is normally run either at idling speeds or at full speed this will not constitute a serious defect.

The invention may be used not only to permit the operation of valves having a normal opening period in terms of crank-angle at speeds higher than normal but also, in the case where positively actuating gear is provided, to achieve a shorter opening period than normal without a reduction in valve lift.

In the case where positively actuating gear is provided it may not be convenient to provide valve opening springs of sufficient stiffness to fulfill the requirements set out above. In this case the invention may be usefully applied by providing such smaller valve opening springs as may conveniently be accommodated. Thus for example, in the case illustrated by Figure 9, the additional springs 16 and 17 may be made smaller, or replaced by a weaker spring which may be better arranged, as shown for example in Figure 10 where the use of a hairpin type spring 42 results in a saving in height. When this is done the cam shaft will be required to provide a part of the valve opening force even at the most effective speed of operation but this force will be smaller than in the normal case and the stresses in the valve gear, in the case of Figure 9 the push-rod and valve lever, will be less.

Yet another embodiment of the invention consists in the provision of additional mechanism to an existing valve mechanism of normal design, converting the system into one having a natural frequency corresponding to the desired movement as already described, or alternatively the original design may provide a substantially normal arrangement together with such additional mechanism. The additional mechanism is so arranged that it can be brought into or put out of operation at will by manual or automatic means. For example, the normal valve gear may consist of a valve urged towards its closed position by springs and opened by positive mechanism such as a cam, roller, guide piston, push-rod and rocker, as shown in Figure 9. To this system is added the additional mechanism whereby the valve opening spring force required for the purpose of the invention may be brought to bear on the system. The additional springs 16 and 17 are contained in cylindrical casings 18 and 19 one of which slides within the other the lower one shown being lowered into its operating position when desired by means of a lever 20 having a forked end attached to a shaft mounted in the valve gear cover. It will also be necessary in most cases to modify the form of connection between the valve lever and valve stem in order to provide a seating for the case of the additional springs, and to ensure that no relative movement occurs between the valve stem and the end of the lever. Other modifications may be required to prevent relative movement between other parts of the oscillating system. A suitable arrangement is shown in Figure 9.

The oscillating system formed in this case when the additional springs are brought into operation, consists of the valve 41, spring plate 43, stem attachment 21, moving cage 19 of the additional springs 16 and 17, valve lever 45, push-rod 22 and connection, guide piston 23 and roller 44, together with all the springs in the system including the push-rod spring. It is to be pointed out that the lever 20 which controls the additional springs 16 and 17 is rotated clear of the spring cage after lowering it into position and does not constitute a part of the oscillating system.

The shaft controlling the additional springs may be operated by means of a pre-set trip device, similar to an engine overspeed trip device actuated by centrifugal force, when the engine reaches a speed approaching the safe working stress limit for the valve gear, the natural frequency of the oscillating system thus produced being designed for a speed somewhat higher than this, so that the system enters a new range of safe operation.

Alternatively the additional springs may be brought into action gradually by rotation of the controlling shaft as the engine speed rises, for example, by the action of a centrifugal governor element and a servo-motor, the process occupying only a small range of speed. The same mechanism will place the additional springs out of action as the speed of the engine is lowered through this range.

The shaft controlling the additional springs may also be operated manually.

The invention has been described and illustrated in relation to poppet valves but it is equally applicable in the positively operated form, where its function is to reduce stresses and permit the use of lighter parts, to other mechanisms which move with oscillatory motion either continuously or intermittently. Figures 11 to 15 show by way of example three other types of valve suitable for controlling the motion of fluids which may be operated in accordance with the invention.

Figure 11 shows a reciprocating piston valve, 24, Figures 12 and 13 a slide valve 24' and Figures 14 and 15 an oscillating rotary valve 29. In each case the respective rod 27, 27', 28 takes the place of the poppet valve stem in the previously described arrangements and may have connected to it any of the positive operating gear and springs previously described, the whole oscillating system and springs being arranged to vibrate at the required frequency. Coil springs and hair-pin type springs have been shown by way of example, but any other type of spring may be employed to produce a similar result.

When the invention is applied to positively operated valve gear consisting of a number of parts, such as valve, lever, push-rod, guide piston and roller for example, the provision of a spring or springs attached to one part only, to produce the required natural frequency, will give an arrangement more satisfactory than the normal one. However acceleration and deceleration forces will be transmitted from this part to those which are not provided with springs. These forces will be smaller than those transmitted on the opening of the valve in the normal system, to overcome the inertia of the connecting parts and in addition the inertia of the valve and spring force.

To effect a further reduction of stresses in the system therefore it is desirable to distribute the spring loading among the moving parts as far as is convenient. Thus for example, in the case shown in Figure 4, springs less stiff than those previously described may be connected to the valve, while an additional spring or pair of springs may be connected to the valve lever as shown at 25, 26.

What I claim is:

1. Valve operating system including a resilient oscillatory assembly of which the valve forms a part and in which the position of equilibrium of the assembly is that in which the valve is intermediate its fully opened and closed positions.

2. Valve operating system including a resilient oscillatory assembly of which the valve forms a part and in which the position of equilibrium of the assembly is that in which the valve is intermediate its fully opened and closed positions, energy supplying means for supplying a small amount of energy periodically to compensate for damping, and means for moving the valve at least in the first cycle of oscillation, at least to one end of its required travel, and releasing it.

3. Valve operating system including a resilient oscillatory assembly of which the valve forms a part and in which the position of equilibrium of the assembly is that in which the valve is intermediate its fully opened and closed positions, energy supplying means for supplying a small amount of energy periodically to compensate for damping, and means for moving the valve at least in the first cycle of oscillation, at least to one end of its required travel, and releasing it, the mass of the oscillating parts and the resilience of the resilient means being such that one cycle of the natural period of oscillation of the assembly is substantially equal to the required valve opening period.

4. Valve operating system for an engine including a resilient oscillatory assembly of which the valve forms a part and in which the position of equilibrium of the assembly is that in which the valve is intermediate its fully opened and closed positions, the mass of the said oscillating parts and resilience of the resilient means being such that one cycle of the natural period of oscillation of the assembly is equal to the required valve opening period at a preferred speed of operation of an engine to which the system is fitted, and valve moving means for positively moving the valve.

5. System as claimed in claim 4 in which means is provided for rendering the valve moving means inoperative at the preferred speed, and gaseous pressure means is provided for supplying a small amount of energy periodically to compensate for damping.

6. Valve operating system including a resilient oscillatory assembly of which the valve forms a part and in which the position of equilibrium of the assembly is that in which the valve is intermediate its fully opened and closed positions, gaseous pressure means for supplying a small amount of energy periodically to compensate for damping, and cam means for moving the valve at least in the first cycle of balanced oscillation, at least to one end of its required travel, and releasing it.

7. Valve operating system including a resilient oscillatory assembly of which the valve forms a part and in which the position of equilibrium of the assembly is that in which the valve is intermediate its fully opened and closed positions, and cam means for supplying a small amount of energy periodically to compensate for damping, said cam means also moving the valve at least in the first cycle of balanced oscillation, at least to one end of its required travel, and releasing it.

8. Valve operating system including a resilient oscillatory assembly of which the valve forms a part and in which the position of equilibrium of the assembly is that in which the valve is intermediate its fully opened and closed positions, and cam means assisted by gaseous pressure means for supplying a small amount of energy periodically to compensate for damping, said cam means also moving the valve at least in the first cycle of balanced oscillation, at least to one end of its required travel, and releasing it.

9. A valve operating system controlling the flow of gases under pressure in a ported cylinder including a valve having a head within the cylinder, influenced by the pressure of gases therewithin and cooperable with the port thereof in a travel between positions at which the port is fully opened and closed, a resilient oscillatory assembly of which the valve forms a part including means providing a position of equilibrium of the assembly in which the valve is intermediate its fully opened and closed position, the port having a recess at its mouth constituting a masking cylinder, the head of said valve having such dimensions parallel with the axis of the port as to cooperate with said masking cylinder and in closing the valve constituting a piston movable within the masking cylinder, and cam means assisted by the pressure of the gases within the cylinder periodically supplying a small amount of energy to compensate for damping, said cam means also moving the valve at least in the first cycle of balanced oscillation at least to one end of the required valve travel and releasing the same.

10. Valve operating system including a resilient oscillatory assembly of which the valve forms a part and in which the position of equilibrium of the assembly is that in which the valve is intermediate its fully opened and closed positions, energy supplying means for supplying a small amount of energy periodically to compensate for damping, means for moving the valve at least in the first cycle of balanced oscillation, at least to one end of its required travel, and releasing it, and means for varying the resilience of the resilient means.

11. A valve operating system controlling the flow of gases in a ported cylinder, the gases having periodic pressure fluctuations, and including a valve having a head within the cylinder, influenced by the pressure of the gases therewithin and cooperable with the port of the cylinder in a travel between positions at which the port is fully opened and closed, a resilient oscillatory assembly of parts of which the valve constitutes one part and including resilient means providing a position of equilibrium of the assembly in which the valve is intermediate its fully opened and closed positions, the mass of the oscillatory parts and the resilience of the resilient means being such that the valve movement is synchronized with the periodic pressure fluctuations of the gas controlled by the valve whereby an increase of gas pressure acting on the valve head periodically supplies an amount of energy sufficient to compensate for damping, cam means for moving the valve at least in the first cycle of balanced oscillation at least to one end of its required travel, and releasing the valve, said resilient means storing energy due to valve movement whereby the force required to return the valve toward the position of equilibrium is substantially wholly provided by the stored energy and the force required to move the valve away from the position of equilibrium being substantially wholly provided by the energy of the moving parts.

12. Valve operating system as claimed in claim 7 in which the cam means also acts to sustain oscillation of the oscillating parts under conditions of non-synchronous periodicity.

13. A valve operating system controlling the flow of gases under pressure in a ported cylinder including a valve which is cooperable with the port in a travel between positions at which the port is fully opened and closed, a resilient oscillatory assembly of which the valve forms a part including means providing a position of equilibrium of the assembly in which the valve is intermediate its fully open and closed position, and means for moving the valve at least in the first cycle of balanced oscillation, at least to one end of the required valve travel and releasing the same.

WILFRED PERCIVAL MANSFIELD.

References Cited in the file of this patent
UNITED STATES PATENTS

| Number | Name | Date |
|---|---|---|
| 842,049 | Wolski | Jan. 22, 1907 |
| 877,194 | Holzwarth | Jan. 21, 1908 |
| 935,989 | Jessen | Oct. 5, 1909 |
| 961,590 | England | June 14, 1910 |
| 1,179,515 | France | Apr. 18, 1916 |
| 1,474,842 | Misuraca | Nov. 20, 1923 |
| 1,529,201 | Meredith | Mar. 10, 1925 |
| 1,549,636 | Von Hacht | Aug. 11, 1925 |
| 1,696,797 | Fornaca | Dec. 25, 1928 |
| 1,720,574 | Schieferstein | July 9, 1929 |
| 1,840,128 | Pfeiffer | Jan. 5, 1932 |
| 2,117,434 | Krebs | May 17, 1938 |